(12) United States Patent
Rathore et al.

(10) Patent No.: US 10,953,777 B1
(45) Date of Patent: Mar. 23, 2021

(54) EXTENDABLE ARMREST ASSEMBLIES FOR PASSENGER VEHICLE SEATING

(71) Applicant: The Boeing Company, Chicago, IL (US)

(72) Inventors: Vijay Singh Rathore, Rajasthan (IN); Niraj Bhaktwarti, Bangalore (IN); Amar Patel, Bangalore (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/557,893

(22) Filed: Aug. 30, 2019

(51) Int. Cl.
*B60N 2/75* (2018.01)
*A47C 7/54* (2006.01)

(52) U.S. Cl.
CPC .............. *B60N 2/757* (2018.02); *A47C 7/543* (2013.01); *B60N 2/767* (2018.02)

(58) Field of Classification Search
CPC ........ B60N 2/757; B60N 2/767; B60N 2/777; A47C 7/543
USPC ... 297/115, 116, 117, 411.3, 411.31, 411.32, 297/411.37, 113
See application file for complete search history.

(56) References Cited

U.S. PATENT DOCUMENTS

| | | | | |
|---|---|---|---|---|
| 1,802,620 A | * | 4/1931 | Scully ..................... | B60N 2/787 297/113 |
| 1,894,621 A | * | 1/1933 | Lehman ................... | A47C 7/543 297/115 |
| 2,085,836 A | * | 7/1937 | Tatum ..................... | B60N 2/757 297/113 X |
| 2,087,574 A | * | 7/1937 | Kaufer .................... | A47C 17/34 297/113 |
| 2,278,749 A | * | 4/1942 | Todd ....................... | B60N 2/753 297/113 |
| 2,580,509 A | * | 1/1952 | Brack ..................... | B61D 31/00 297/113 X |
| 2,646,107 A | * | 7/1953 | Murphy .................. | A47C 1/124 297/113 |
| 3,168,346 A | * | 2/1965 | Rei, Jr. ................... | B60N 2/757 297/113 |
| 3,926,473 A | * | 12/1975 | Hogan .................... | B60N 2/793 297/115 X |
| 4,159,145 A | * | 6/1979 | Quakenbush .......... | A47C 7/543 297/113 |
| 5,795,025 A | | 8/1998 | Murphy | |
| 5,800,013 A | | 9/1998 | Branham et al. | |
| 5,957,407 A | * | 9/1999 | Auestad ............. | B64D 11/0693 244/118.6 |

(Continued)

FOREIGN PATENT DOCUMENTS

| | | | | |
|---|---|---|---|---|
| CA | 2569766 A1 | * | 12/2005 | ............. B60N 2/757 |
| EP | 2698276 A1 | * | 2/2014 | ............. B64D 11/06 |

(Continued)

*Primary Examiner* — Rodney B White
(74) *Attorney, Agent, or Firm* — Kolisch Hartwell, P.C.

(57) ABSTRACT

Extendable armrest assembly for passenger chair structures, the armrest assembly including a primary armrest configured to pivotably couple to a passenger chair structure, and a secondary armrest disposed beneath, aligned with, and coupled to the primary armrest, where the secondary armrest can be moved from a first stowed position aligned with and beneath the primary armrest and a second extended position in which a portion of surface of the secondary armrest surface is exposed and accessible for use by a passenger seated in the passenger chair structure.

20 Claims, 7 Drawing Sheets

(56) References Cited

U.S. PATENT DOCUMENTS

| | | | | |
|---|---|---|---|---|
| 6,648,393 B1* | 11/2003 | Milnar | ............... | B60N 2/01583 |
| | | | | 296/65.11 |
| 7,255,402 B1* | 8/2007 | Haddad | ................... | B60N 2/76 |
| | | | | 297/411.32 |
| 8,419,124 B2* | 4/2013 | Kramer | ................ | B66B 9/0846 |
| | | | | 297/411.37 X |
| 8,491,055 B2* | 7/2013 | Freer, II | ................ | B60N 2/753 |
| | | | | 297/411.31 X |
| 8,528,861 B2* | 9/2013 | Kneller | ................ | B60N 2/002 |
| | | | | 297/115 X |
| 8,534,761 B2* | 9/2013 | Saxton | ................... | B60N 2/753 |
| | | | | 297/411.32 |
| 8,931,846 B2* | 1/2015 | Merensky | .............. | B64D 11/06 |
| | | | | 297/411.3 |
| 8,931,847 B2* | 1/2015 | Cailleteau | ............. | B64D 11/06 |
| | | | | 297/411.32 |
| 9,522,618 B2* | 12/2016 | Almeida | ................ | A47C 7/543 |
| 9,610,919 B2* | 4/2017 | Taubert | ............. | B61D 33/0092 |
| 9,630,720 B2* | 4/2017 | Saint-Jalmes | ...... | B64D 11/0644 |
| 9,828,101 B2* | 11/2017 | Shih | ........................ | B60N 2/75 |
| 10,104,972 B2* | 10/2018 | Cummins | ............ | B61D 33/005 |
| 2005/0194828 A1* | 9/2005 | Johnson | ............... | B64D 11/0643 |
| | | | | 297/411.32 |

FOREIGN PATENT DOCUMENTS

| | | | | |
|---|---|---|---|---|
| WO | WO-2013163260 A1 * | 10/2013 | ............ | B60N 2/753 |
| WO | 20150149120 A1 | 10/2015 | | |
| WO | WO-2020025999 A1 * | 2/2020 | ............ | B60N 2/763 |

\* cited by examiner

EXTENDABLE ARMREST ASSEMBLIES FOR PASSENGER VEHICLE SEATING

FIELD

This disclosure relates to armrest assemblies for use in passenger vehicles. More specifically, the disclosure relates to armrest assemblies including a primary armrest and a secondary armrest for use by passengers in adjacent passenger seats.

INTRODUCTION

The seating arrangements provided by passenger vehicles typically reflect the collision of multiple design considerations, many of which are contradictory Larger and more comfortable passenger seats would be nearly universally popular with passengers, but would result in lower passenger capacities and lower income for the carrier. Larger seating could also increase gross vehicle weight, therefore increasing operating costs (such as fuel costs).

Passenger seating rows typically provide a single armrest between adjacent pairs of seats. While the intermediate arm rest can often be either stowed or deployed, the armrest itself typically is only usable by a single passenger, and so very often one or the other of the passengers sharing the single armrest must compromise their seating position and comfort.

What is needed is an armrest assembly that can provide a usable armrest for the passengers on either side of the armrest assembly, but that does not substantially increase the size of the armrest, or the weight of the armrest.

SUMMARY

The present disclosure provides armrest assemblies for passenger seating that include a primary armrest and an extendable secondary armrest, for simultaneous use by passengers on either side of the armrest assembly.

The present disclosure may provide an extendable armrest assembly that includes an elongate primary armrest having a proximal end, a distal end, an upper surface, and a lower surface, where the upper surface includes a primary armrest surface. The primary armrest further includes a coupling member disposed at the proximal end of the primary armrest, where the coupling member is configured to be coupled to a frame of a passenger chair structure, and the primary armrest is pivotable between a substantially horizontal deployed position and a substantially vertical retracted position. The extendable armrest assembly further includes an elongate secondary armrest disposed beneath and in alignment with the primary armrest, where the secondary armrest has a proximal end, a distal end, and an upper surface that includes a secondary armrest surface. The secondary armrest is coupled to the primary armrest so that the secondary armrest is movable between a first stowed position in which the secondary armrest is aligned with and at least substantially beneath the primary armrest and a second extended position in which a portion of the secondary armrest surface is exposed and accessible for use by a passenger in the passenger chair structure.

The disclosure may provide passenger vehicle chair structures that include a frame for the chair structure, and first and second passenger seats coupled to the frame and disposed adjacent one another. The chair structure further includes an armrest assembly that is disposed between the first and second passenger seats and that is pivotably coupled to the frame so that the armrest assembly is pivotable between a substantially horizontal deployed position and a substantially vertical retracted position. The coupled armrest assembly includes a primary armrest and a secondary armrest, where the primary armrest includes a primary armrest surface and is configured so that when the armrest assembly is in its deployed position, the primary armrest surface is accessible for use by a first passenger. The secondary armrest includes a secondary armrest surface, and is coupled to the primary armrest so that the secondary armrest is movable from a first stowed position in which the secondary armrest is aligned with and at least substantially beneath the primary armrest and a second extended position in which at least a portion of the secondary armrest surface is exposed and accessible for use by a second passenger.

The disclosed features, functions, and advantages of the disclosed armrest assemblies may be achieved independently in various embodiments of the present disclosure, or may be combined in yet other embodiments, further details of which can be seen with reference to the following description and drawings.

DEFINITIONS

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

DESCRIPTION

Various aspects and examples of armrest assemblies, passenger seats, and passenger vehicle chair structures are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Figure 1:
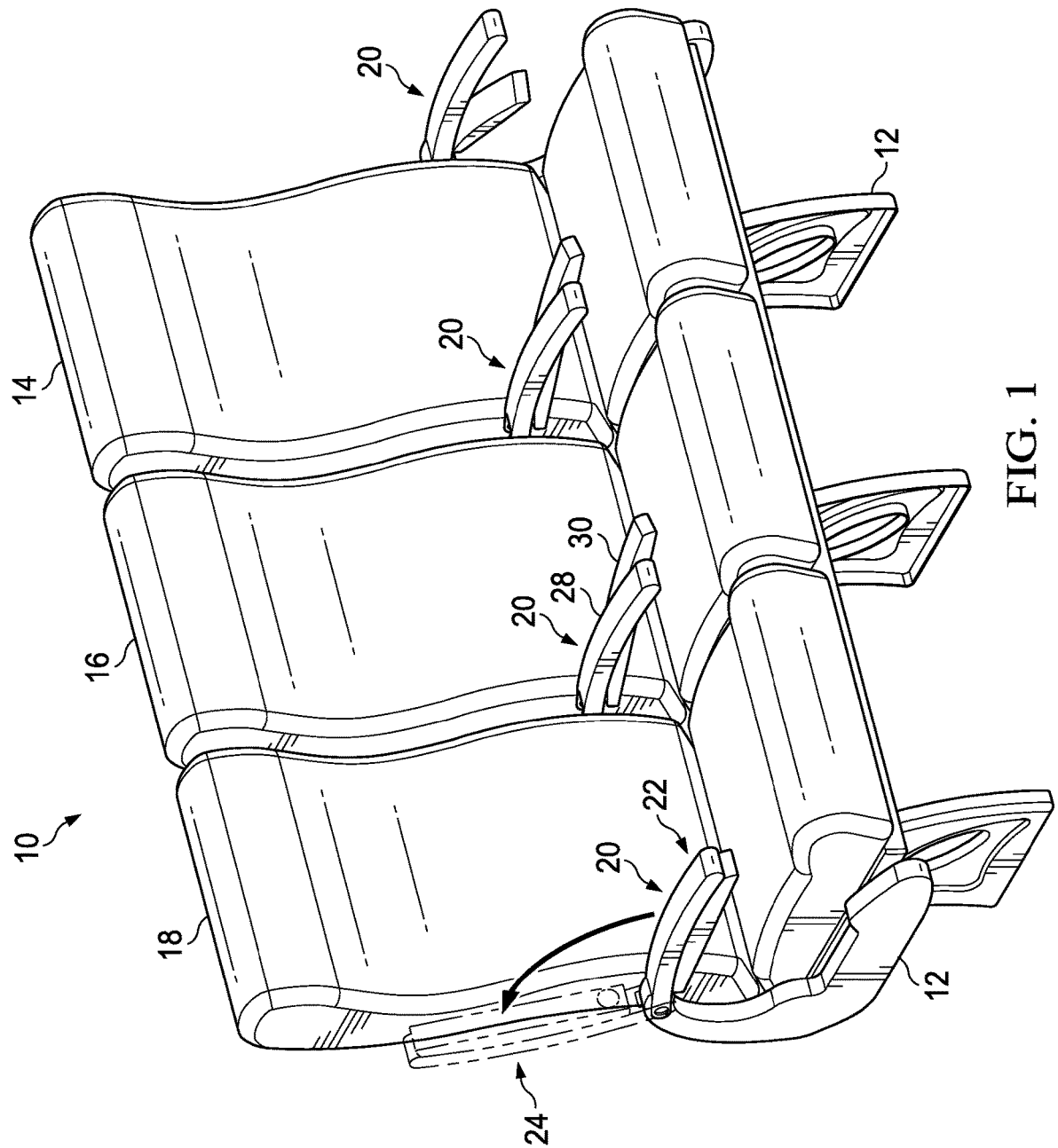
FIG. 1 depicts an illustrative example of a passenger vehicle chair structure according to the present disclosure.

FIG. 1 depicts an illustrative passenger vehicle chair structure 10 according to the present disclosure. Chair structure 10 includes a frame 12 for chair structure 10, and a first passenger seat 14, a second passenger seat 16, and a third passenger seat 18 disposed in alignment. Each passenger seat is secured to frame 12. Intermediate each pair of adjacent passenger seats is an extendable armrest assembly 20 that is pivotably coupled to frame 12 so that armrest assembly 20 can pivot between a substantially horizontal deployed position 22 and a substantially vertical retracted position 24. While the armrest assemblies disclosed herein can be particularly advantageous when disposed between two adjacent passenger seats, such armrest assemblies can also be useful when installed at an end of the passenger vehicle chair structure 10.

Similarly, although the illustrative chair structure 10 is depicted as having three passenger seats, this arrangement is merely exemplary, and a given chair structure can include two or more seats secured to a frame, with the passenger seats disposed adjacent to one another to form a row of passenger seating, and an extendable armrest assembly 20 disposed between at least two passenger seats that are adjacent one another. The armrest assemblies of the present disclosure can, of course, also be used as a terminal armrest, such as armrest 30 disposed at an end of a row of passenger seating.

Passenger vehicle chair structure 10 is designed and configured to provide seating for passengers during transport aboard a passenger vehicle. A passenger vehicle, as used herein, can be any vehicle configured to transport seated passengers. Appropriate passenger vehicles can include motor vehicles such as buses and motor coaches, trolleys, trams, trains, boats, and aircraft, among others. A passenger vehicle can be publicly or privately owned, and can be a component of a public transit system, such as a member of a fleet of passenger vehicles. A passenger vehicle may include seating for as few as eight seated passengers, or may include seating for twelve seated passengers, or significantly more, as is typically the case for buses, trains, and aircraft, among others. The extendable armrest assemblies disclosed herein can be particularly advantageous when configured for use in a passenger aircraft, a passenger train, a passenger ship, or a passenger bus.

Figure 2:
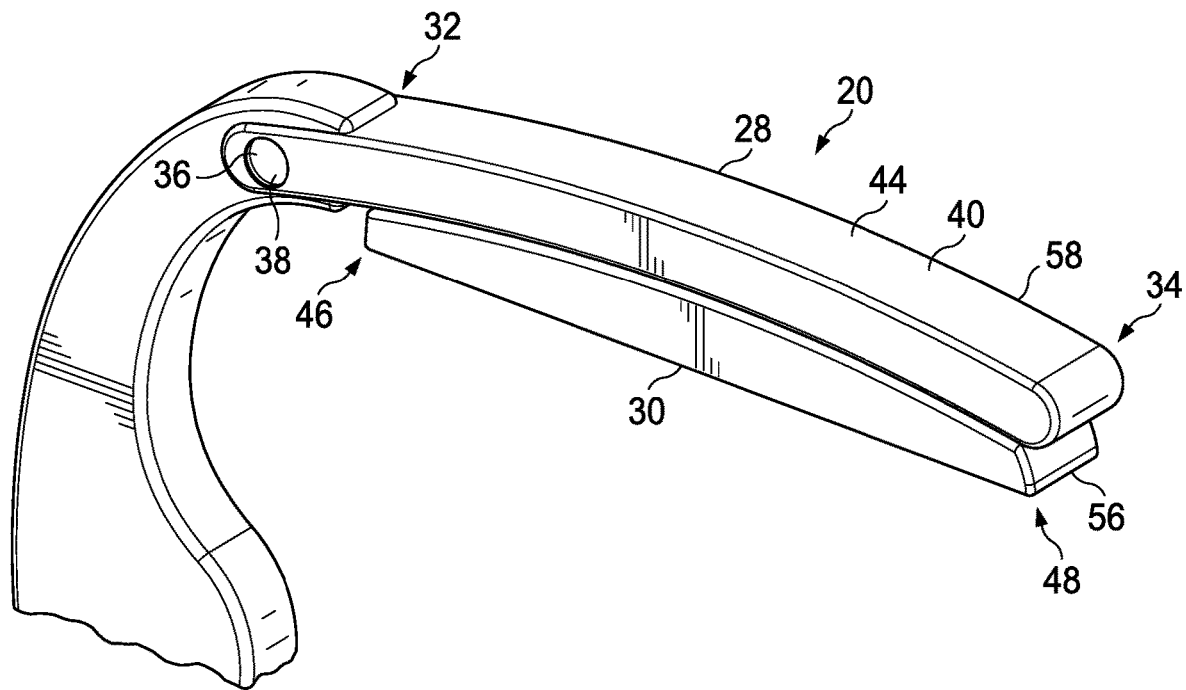
FIG. 2 depicts an illustrative example of an extendable armrest assembly in a first stowed position, according to the present disclosure.
Figure 3:
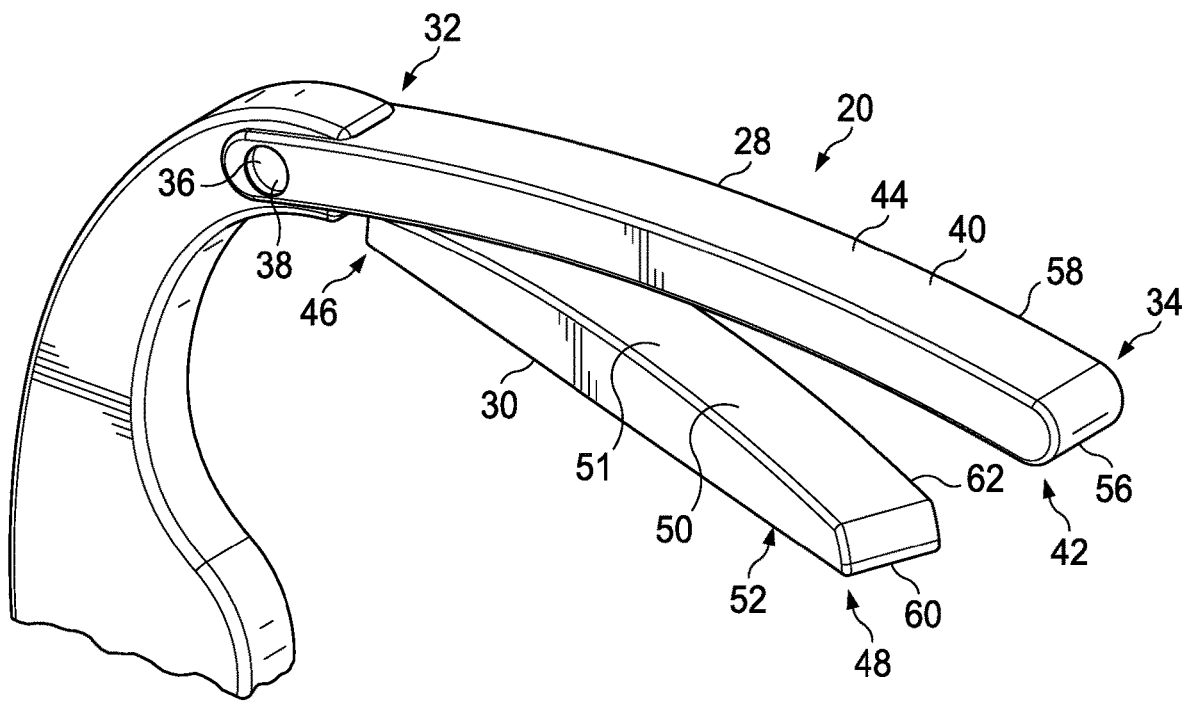
FIG. 3 depicts the extendable armrest assembly of FIG. 2 in a second extended position.

As shown more clearly in FIGS. 2 and 3, extendable armrest assembly 20 can include an upper portion that is an elongate primary armrest 28, and an elongate secondary armrest 30, disposed beneath and in alignment with primary armrest 28.

Elongate primary armrest 28 can include a proximal end 32, and a distal end 34. As mentioned, extendable armrest assembly 20 can be pivotably coupled to frame 12, for example by a coupling member 36 disposed at proximal end 32 of primary armrest 28, where coupling member 36 can incorporate any mechanism that permits armrest assembly 20 to be pivoted between a substantially horizontal deployed position and a substantially vertical retracted position. As shown in FIGS. 2 and 3, coupling member 36 can include a substantially horizontal hinge structure 38, and optionally further includes one or more retention devices or other elements to help retain the armrest in one or both of its deployed position and retracted position unless being actively moved by a user.

Elongate primary armrest 28 can additionally include an upper surface 40 and a lower surface 42, where upper surface 40 is configured for, and intended for, serving as a primary armrest surface 44. That is, when armrest assembly 20 is in its substantially horizontal deployed position 22 between the first passenger seat 14 and second passenger seat 16, primary armrest surface 44 can be appropriately positioned and available for use by a passenger in either first passenger seat 14 or second passenger seat 16 as an armrest, without further manipulation or modification. Primary armrest surface 44 can be substantially planar, or incorporate a simple or complex curvature, provided that the curvature of primary armrest surface 44 is not so large as to compromise the function of primary armrest surface 44 as a passenger armrest.

Figure 4:
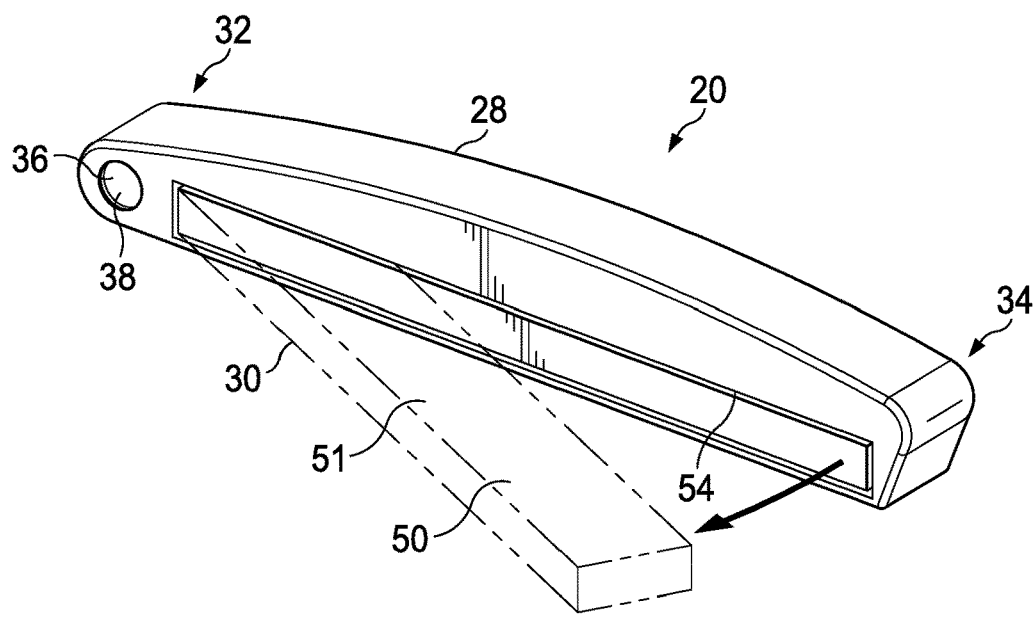
FIG. 4 depicts an alternative illustrative example of an extendable armrest assembly, according to the present disclosure.

Secondary armrest 30, which can be disposed beneath and substantially aligned with primary armrest 28, can include a proximal end 46, a distal end 48, an upper surface 50, and a lower surface 52. Secondary armrest 30 can be coupled to primary armrest 28 in such a way that secondary armrest 30 is movable from a first stowed position (FIG. 2) to a second extended position (FIG. 3). When secondary armrest 30 is in its first stowed position, secondary armrest 30 can be aligned with and at least substantially beneath primary armrest 28. In this stowed position, with upper surface 50 facing and adjacent to lower surface 42 of primary armrest 28, upper surface 50 is not available for use as an armrest. Alternatively, or in addition, primary armrest 28 can be configured to define a slot or niche 54 in the armrest that is sized to accept secondary armrest 30 when the secondary armrest is in its first stowed position, as shown in FIG. 4.

Secondary armrest 30 of extendable armrest assembly 20 can be configured to be movable to a second extended position, where in the second extended position at least a portion of upper surface 50 is exposed and accessible for use as a secondary armrest surface 51 by a passenger. As for primary armrest surface 44, secondary armrest 30 can be substantially planar, or incorporate a simple or complex curvature. Extendable armrest assembly 20 may be configured so that primary armrest surface 44 and secondary armrest surface 51 define similar contours such that the two surfaces can be substantially parallel, whether secondary armrest 30 is stowed or extended.

Primary armrest surface 44 of primary armrest 28 can include a beveled or rounded edge 56 along at least a portion of an edge 58 or periphery of primary armrest 28. Similarly and independently, secondary armrest surface 51 of secondary armrest 30 can include a beveled or rounded edge 60 along at least a portion of an edge 62 of secondary armrest 30.

Extendable armrest assembly 20 can optionally further include one or more retention devices 64 that are configured to releasably retain secondary armrest 30 in its first stowed position. That is, retention device 64 can be configured to retain secondary armrest 30 in its first stowed position unless a sufficient force is applied to secondary armrest 30 to overcome the retention device 64 and move secondary armrest 30 to its second extended position.

Alternatively, or in addition, extendable armrest assembly 20 can further include one or more retention devices 64 that are configured to releasably retain secondary armrest 30 in its second extended position, until sufficient force is applied to secondary armrest 30 to overcome retention device 64 and move secondary armrest 30 back to its first stowed position.

A variety of types of retention devices for retaining secondary armrest 30 in one or both of its stowed and extended positions can be used in the extendable armrest assemblies of the present disclosure. For example, retention device 64 can include a detent mechanism. Detent mechanisms typically include a follower and a detent, respectively, on two parts that move with respect to one another. The follower, on one of the parts, can be biased to press against the other moving part, where the detent is formed. The detent can be a recess or impression sufficiently complementary to the follower that the follower will at least partially enter the detent. When the follower is not directly interacting with the detent, there is generally a reduced holding force between the two moving parts. However, when the follower nears the detent, the retention mechanism can "click" into position as the follower enters the detent. When the follower is interacting with the detent, an application of force can be required to dislodge the follower from the detent, helping to retain the desired relative position between the two moving parts.

Figure 5:
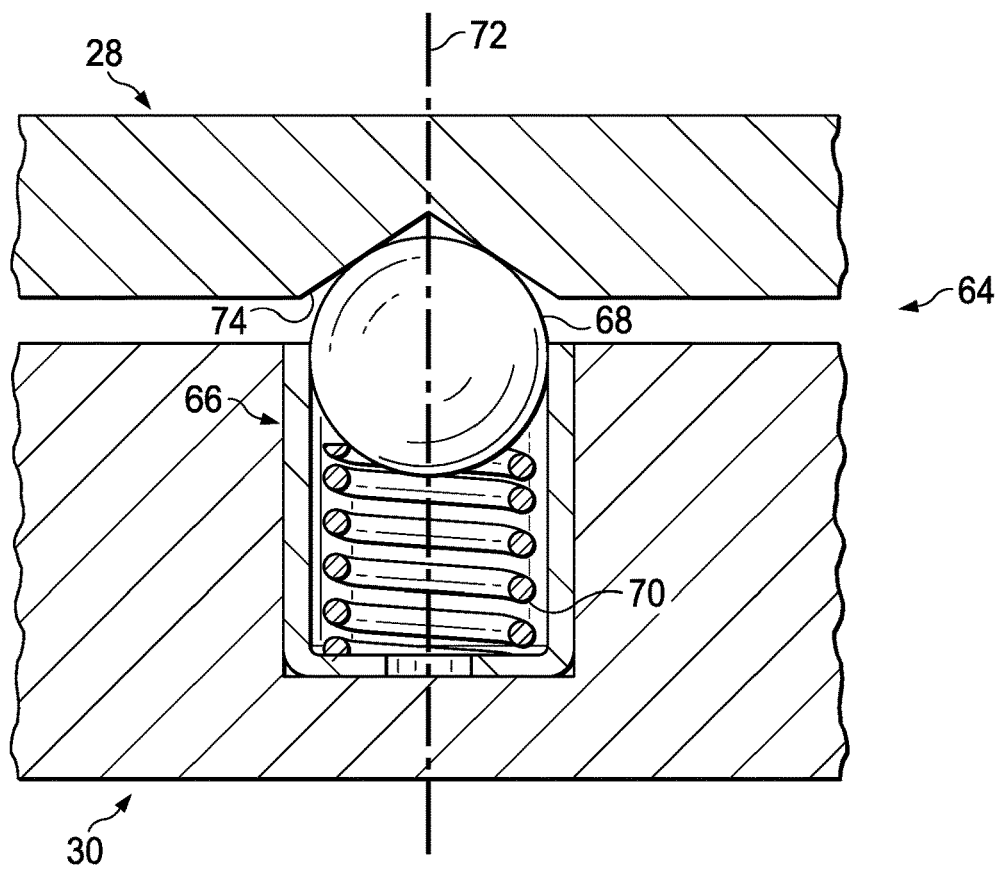
FIG. 5 is a cross-sectional view of a ball-and-spring detent device.

In a particular example, as shown in FIG. 5, retention device 64 can include a detent mechanism having a biased ball follower 66, where biased ball follower 66 includes a ball 68 and a biasing means such as spring 70. Biased ball follower 66 can be attached and/or embedded in one of the primary armrest 28 and secondary armrest 30 in such a way that ball 68 is movable along a vertical axis 72 (that is, an axis that is orthogonal to the planes of primary armrest surface 44 and secondary armrest surface 51). The other of primary armrest 28 and secondary armrest 30 can include a complementary detent recess 74 (or depression) configured and sized such that ball 68 can positively interact with detent recess 74 to releasably retain secondary armrest 30 in one or more desired relative positions.

Figure 7:
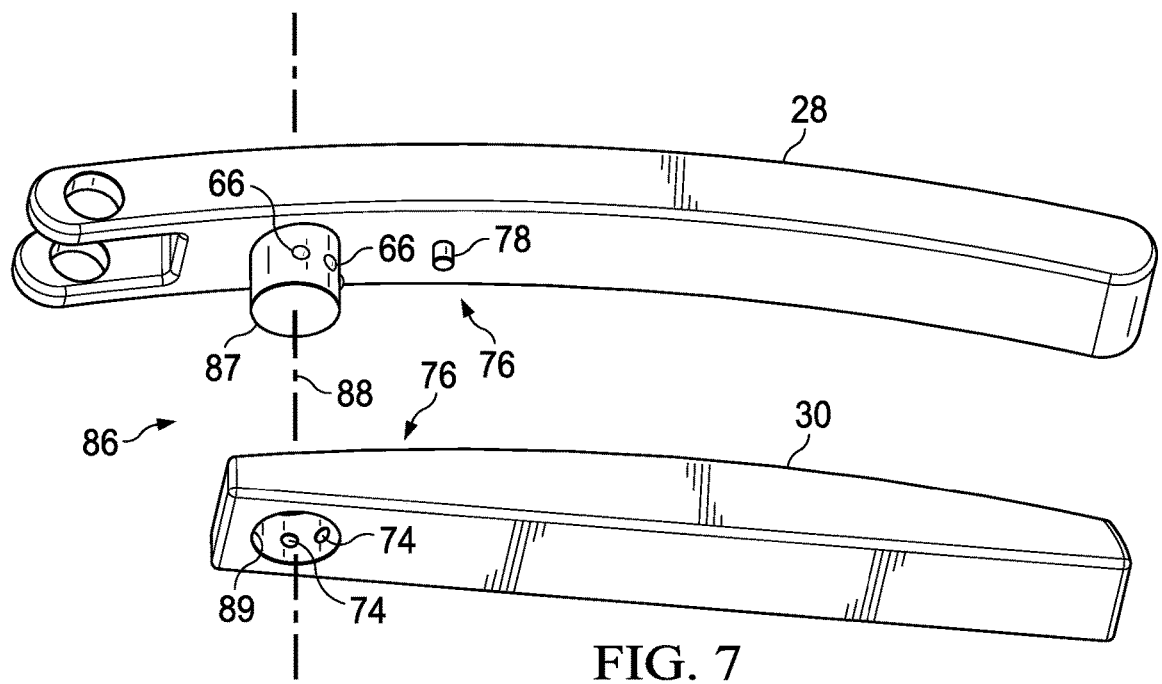
FIG. 7 depicts an exploded view of an illustrative extendable armrest assembly incorporating a pivotal coupling.
Figure 8:
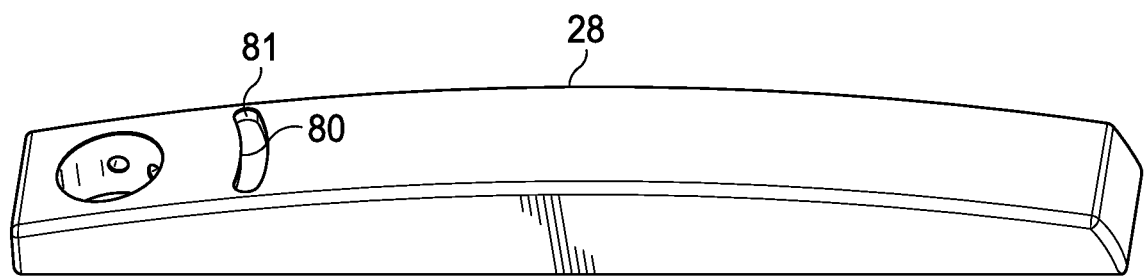
FIG. 8 depicts an illustrative example of a secondary armrest incorporating a groove for a travel stop.

Extendable armrest assembly 20 can optionally and additionally include one or more travel stops 76 configured to limit an extent of the motion of secondary armrest 30 with respect to primary armrest 28. A variety of travel stop designs may be envisioned, without limitation, for inclusion in the presently disclosed armrest assemblies. For example, travel stop 76 can include a tab or post 78 that projects downwardly from lower surface 42 of primary armrest 28 (as shown in FIG. 7) and is configured to interact with a groove 80 formed in upper surface 50 of secondary armrest 30 (as shown in FIG. 8). The positive interaction between post 78 and groove 80 permits secondary armrest 30 to be pivoted to a second and extended position, either in a clockwise or anti-clockwise direction, until post 78 reaches an end surface 81 of groove 80, substantially preventing secondary armrest 30 from being moved further.

Figure 6:
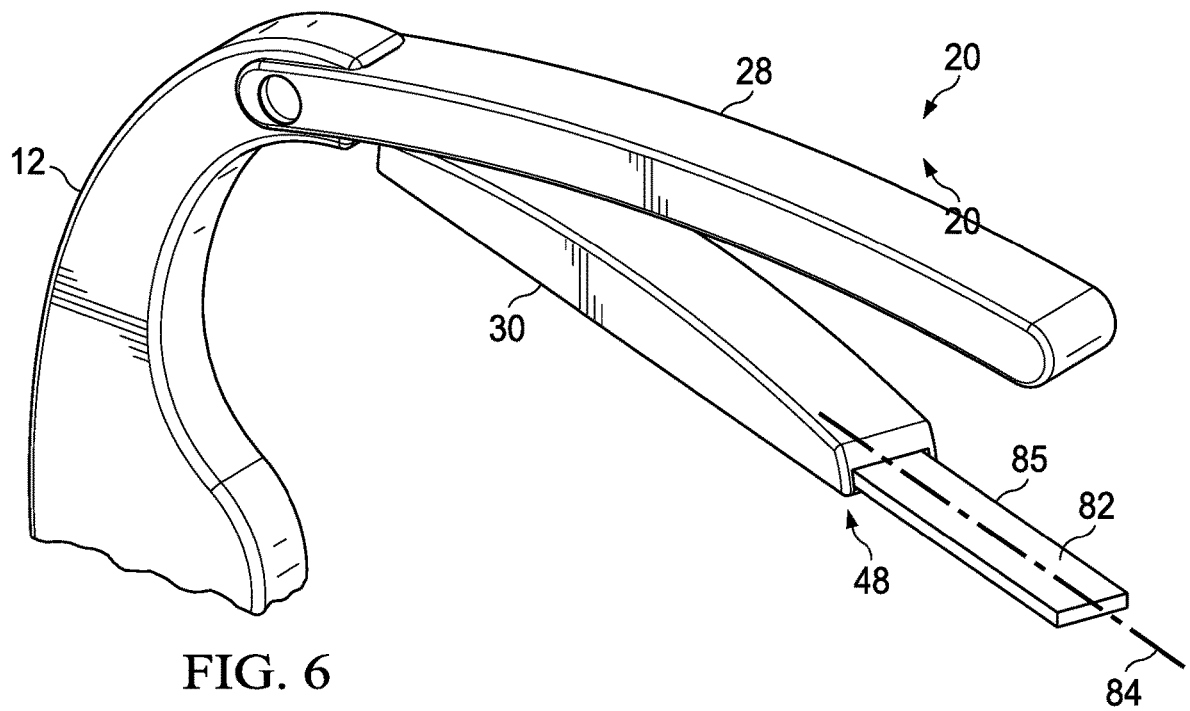
FIG. 6 depicts an illustrative example of an extendable armrest assembly incorporating a slidable distal extension, according to the present disclosure.

Secondary armrest 30 of extendable armrest 20 can optionally further include a distal extension 82, where distal extension 82 is configured to be extended to a position distal to secondary armrest 30 when the secondary armrest is not in its first stowed position, as shown in FIG. 6. Distal extension 82 can incorporate a translational (i.e. sliding) coupling or pivotal coupling to secondary armrest 30, and can be configured to provide an extension from distal end 48 of secondary armrest 30 along or substantially parallel to a longitudinal axis 84 of secondary armrest 30. Distal extension 82 may include a planar extension body 85 that can be stowed under and/or within secondary armrest 30 for example within a slot formed by secondary armrest 30. Distal extension 82 can optionally incorporate one or more retention devices and/or travel stops, as discussed above, in order to facilitate the controlled extension of extension body 85, and to limit the maximum extension of extension body 85, respectively.

Secondary armrest 30 can be coupled or attached to primary armrest 28 in any way that permits or facilitates the movement of secondary armrest 30 from its first stowed position to its second extended position. Although two particular arrangements for extendable armrest 20 are described below, numerous variations and modifications can be made to the armrest assembly without departing from the spirit and scope of the present disclosure.

Pivotable Coupling

In one example, as previously shown in FIGS. 1-4, secondary armrest 30 can be coupled to primary armrest 28 by a pivotable coupling 86. In this example, pivotable coupling 86 attaches proximal end 46 of secondary armrest 30 with proximal end 32 of primary armrest 28. Generally, pivotable coupling 86 can be arranged so that a pivot axis 88 of pivotable coupling 86 is substantially perpendicular to both primary armrest surface 44 and secondary armrest surface 51.

Although any of a variety of possible pivotal coupling designs may be utilized for the armrest assemblies of this disclosure, in the example depicted in FIG. 7 primary armrest 28 includes a cylindrical projection 87 that extends downwardly from primary armrest 28, while secondary armrest 30 defines a corresponding cylindrical aperture 89 configured to receive cylindrical projection 87. Secondary armrest 30 is able to then pivot around pivot axis 88, which is defined by the interaction of cylindrical projection 87 and cylindrical aperture 89.

When secondary armrest 30 is in its stowed position "A" as shown in FIG. 2, secondary armrest 30 is disposed beneath, and substantially aligned with, primary armrest 28. Secondary armrest 30 may be sized so that the outline of secondary armrest 30 is no larger than the corresponding outline of primary armrest 28, such that no portion of upper surface 50 of secondary armrest 30 extends beyond the edge of primary armrest 28. Additionally, or in the alternative, upper surface 50 of secondary armrest 30 can be adjacent to and facing lower surface 42 of primary armrest 28. Upper surface 50 can be in contact with lower surface 42, provided that such contact does not substantially hinder extending secondary armrest 30 when desired.

Secondary armrest 30 is shown in its extended position "B" in FIG. 3. To extend secondary armrest 30, the armrest can be pivoted around pivot axis 88 of pivotable coupling 86 to expose at least a portion of secondary armrest surface 51 for use by a seated passenger. As shown, secondary armrest 30 can be positioned for use by the passenger of an adjacent seat by pivoting secondary armrest towards an adjacent seat. However, extendable armrest assembly 20 can be configured so that secondary armrest 30 is capable of pivoting toward the adjacent seat on one or both of each side of armrest assembly 20. That is, in the case of armrest assembly 20 disposed between passenger seat 16 and passenger seat 18 of FIG. 1, secondary armrest 30 can be configured to pivot in a clockwise manner to expose secondary armrest surface 51 and bring it closer to the occupant of the right-hand passenger seat 18; and secondary armrest can also be configured to pivot in a counter-clockwise manner to expose secondary armrest surface 51 and bring it closer to the occupant of the central passenger seat 16.

The pivotable armrest assembly optionally further includes one or more retention devices 64, as described above, where retention device 64 is configured to releasably retain secondary armrest 30 in its first stowed position, particularly where the retention device includes a based ball follower on one of the primary and secondary armrests, and a complementary detent on the other of the primary and secondary armrests.

Where a pivotable armrest assembly includes a detent mechanism, such as a biased ball follower and detent, the detent mechanism can be configured to impact the relative movement between primary armrest 28 and secondary armrest 30 by creating an interaction between upper surface 50 of secondary armrest 30 and lower surface 42 of primary armrest 28. Alternatively, or in addition, the detent mechanism(s) can be included in pivotal coupling 86, where they can be configured to impact the rotational movement between primary armrest 28 and secondary armrest 30 by impacting the rotational movement of pivotal coupling 86. For example, as shown in FIG. 7, Cylindrical projection 87 includes a plurality of biased ball bearing followers 66 on the outer surface of the cylinder, and aperture 89 includes a corresponding plurality of recesses 74. As projection 87 rotates within aperture 89, the detent mechanisms can help retain secondary armrest 30 in one or more preferred positions.

As discussed above, extendable armrest assembly 20 optionally further includes one or more travel stops 76 that are configured to limit the extent of movement of secondary armrest 30 relative to first armrest 28. Where secondary armrest 30 is coupled to primary armrest 28 by a pivotable coupling, extendable armrest 20 can include a travel stop 76 that is configured to limit the extent of movement of secondary armrest 30 to a maximum permitted extent. For example, the maximum permitted extent of travel for secondary armrest 30 can correspond to any desirable pivot angle, but the maximum permitted extent of travel can correspond to, for example, a pivot angle of 30° to 45°, with respect to a longitudinal axis of primary armrest 28.

Translational Coupling

Figure 9:
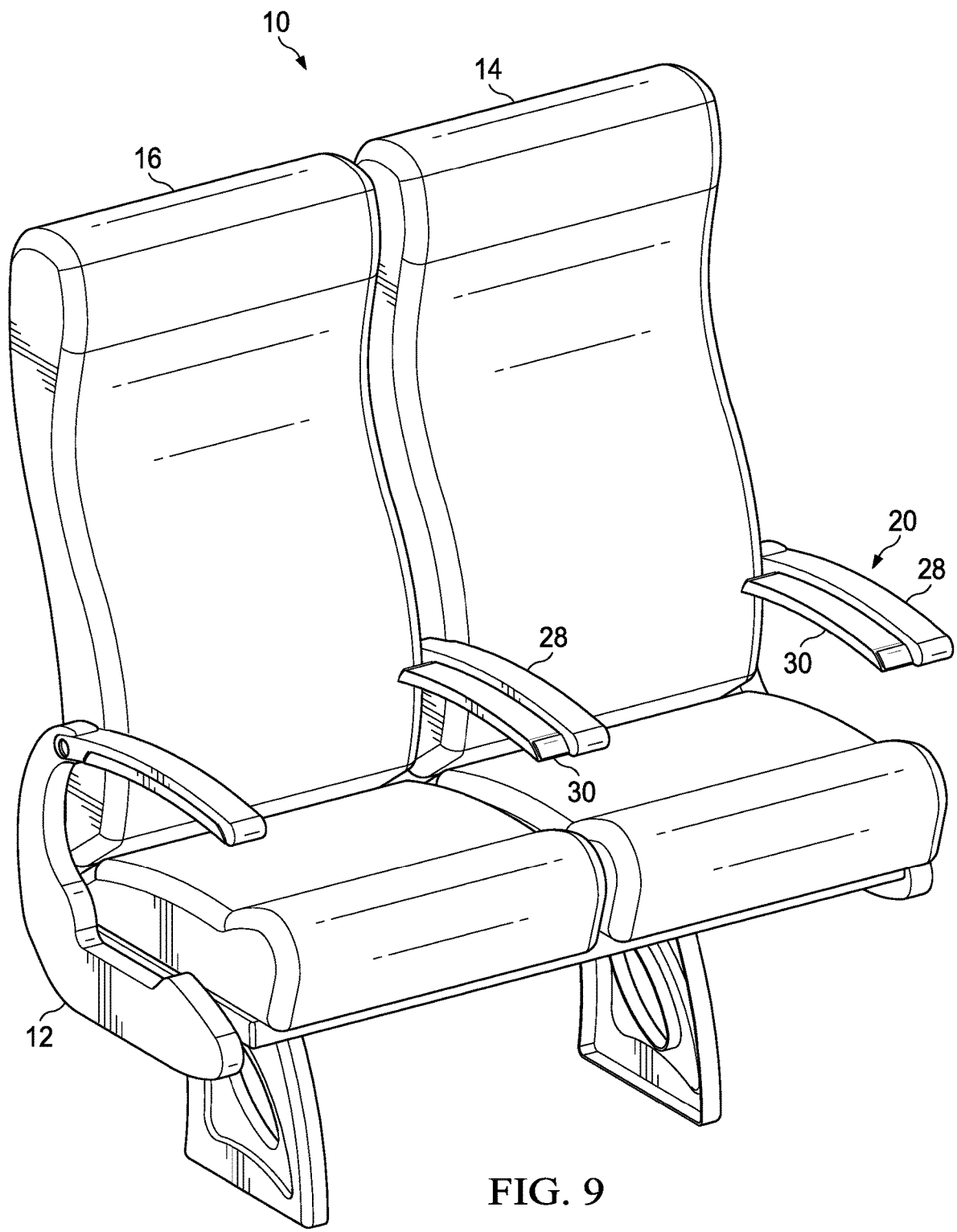
FIG. 9 depicts an illustrative example of an alternative passenger vehicle chair structure according to the present disclosure.

In an alternative example, as shown in FIGS. 8-9, passenger vehicle chair structure 10 can incorporate extendable armrest assemblies 20 in which secondary armrest 30 can be coupled to primary armrest 28 by a translational coupling 92. That is, secondary armrest 30 is configured to move from its first stowed position "A" to its second extended position "B" by sliding to one side or the other of primary armrest 28, thereby exposing at least a portion of secondary armrest surface 51 for use by seated passenger as an armrest.

When secondary armrest 30 is in its stowed position, secondary armrest 30 is disposed beneath, and substantially aligned with, primary armrest 28. Secondary armrest 30 may be sized so that the outline of secondary armrest 30 is no larger than the corresponding outline of primary armrest 28, such that no portion of upper surface 50 of secondary armrest 30 extends beyond the edge of primary armrest 28. Additionally, or in the alternative, upper surface 50 of secondary armrest 30 can be adjacent to and facing lower surface 42 of primary armrest 28. Upper surface 50 can be in contact with lower surface 42, provided that such contact does not substantially hinder the translation of secondary armrest 30 when desired.

Figure 10:
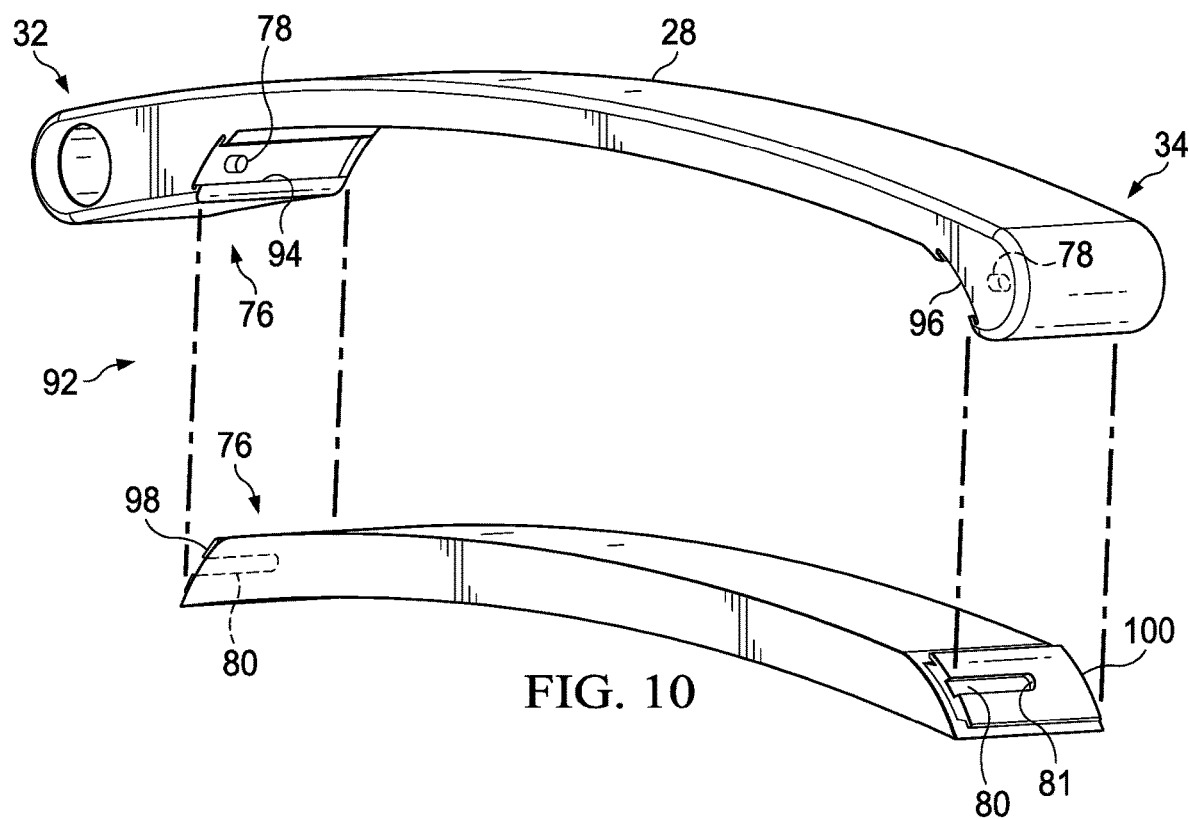
FIG. 10 depicts an exploded view of an illustrative extendable armrest assembly incorporating a translational coupling.

As shown in FIG. 10, translation coupling 92 can include one or more slots 94 and 96, typically formed at or near proximal end 32 and distal end 34 of primary armrest 28. Translational coupling 92 can also include complementary lips or flanges 98 and 100 formed on secondary armrest 30 that slidably interact with slot 94 and slot 96, respectively, so that flanges 98 and 100 can slide within the slots. Primary armrest 28 and secondary armrest 30 can be configured to permit secondary armrest 30 to translate to an extended position to one side of primary armrest 28, to the other side of primary armrest 28, or can be configured so that secondary armrest 30 can be translated to either side of primary armrest 28, so that secondary armrest surface 51 can be used by a passenger in first passenger seat 14 or second passenger seat 16 as desired, as shown in FIG. 9.

The extendable armrest assembly optionally further includes one or more retention devices 64, as described above, where retention device 64 is configured to releasably retain secondary armrest 30 in one or more positions, particularly where the retention device includes a biased ball follower on one of the primary and secondary armrests, and a complementary detent on the other of the primary and secondary armrests. Retention device 64 can be configured to releasably retain secondary armrest 30 in its first stowed position. Alternatively, or in addition, retention device 64 can be configured to releasably retain secondary armrest 30 in its second extended position.

Extendable armrest assembly 20 optionally further includes one or more travel stops 76 that are configured to limit the extent of translational movement of secondary armrest 30 relative to primary armrest 28. Where secondary armrest 30 is coupled to primary armrest 28 by a translational coupling 92, extendable armrest 20 can include a travel stop 76 that is configured to limit the extent of sideways movement of secondary armrest 30 to a maximum permitted extent. For example, and as shown in FIG. 10, primary armrest 28 may include one or more tabs or posts 78 each configured to positively interact with a corresponding groove 80 so that secondary armrest 30 can be translated sidewise until post 78 is stopped by the end surface 81 of its corresponding groove 80.

Examples, Components, and Alternatives

The following numbered paragraphs describe selected aspects of the disclosed extendable armrest assemblies and passenger chair structures. The examples in these sections are intended for illustration and should not be interpreted as limiting the entire scope of the present disclosure. Each section may include one or more distinct embodiments or examples, and/or contextual or related information, function, and/or structure.

A1. An extendable armrest assembly, comprising an elongate primary armrest having a proximal end, a distal end, an upper surface, and a lower surface, where the upper surface includes a primary armrest surface; where the primary armrest includes a coupling member disposed at the proximal end of the primary armrest, the coupling member being configured to pivotably couple the primary armrest to a frame of a passenger chair structure, so that when coupled the primary armrest is pivotable between a substantially horizontal deployed position and a substantially vertical retracted position; and an elongate secondary armrest, disposed beneath and aligned with the primary armrest, the secondary armrest having a proximal end, a distal end, and an upper surface that includes a secondary armrest surface; where the secondary armrest is coupled to the primary armrest so that the secondary armrest is movable from a first stowed position in which the secondary armrest is aligned with and at least substantially beneath the primary armrest and a second extended position in which a portion of the secondary armrest surface is exposed and accessible for use by a passenger in the passenger chair structure.

A2. The armrest assembly of paragraph A1, where the primary armrest surface and the secondary armrest surface are substantially parallel.

A3. The armrest assembly of paragraph A1, where the secondary armrest is coupled to the primary armrest by a pivotable coupling, and a pivot axis of the pivotable coupling is substantially perpendicular to both the primary armrest surface and the secondary armrest surface, so that pivoting the secondary armrest at the pivotable coupling exposes at least a portion of the secondary armrest surface for use by the seated passenger.

A4. The armrest assembly of paragraph A1, where the secondary armrest is coupled to the primary armrest by a translational coupling, such that the secondary armrest can be translated to a side of the primary armrest to expose at least a portion of the secondary armrest surface for use by the seated passenger.

A5. The armrest assembly of paragraph A1, where the secondary armrest is coupled to the primary armrest by a coupling that permits the secondary armrest to be moved to an extended position at either side of the primary armrest.

A6. The armrest assembly of paragraph A1, further comprising a travel stop that is configured to limit an extent of movement of the secondary armrest relative to the primary armrest.

A7. The armrest assembly of paragraph A1, wherein the secondary armrest is coupled to the primary armrest by a pivotable coupling, further comprising a travel stop that is configured to limit an extent of movement of the secondary armrest so that when the secondary armrest is in the second extended position a longitudinal axis of the secondary armrest is at an angle of 30° to 45° to a longitudinal axis of the primary armrest.

A8. The armrest assembly of paragraph A1, further comprising a retention device configured to releasably retain the secondary armrest in the first stowed position.

A9. The armrest assembly of paragraph A1, further comprising a retention device configured to releasably retain the secondary armrest in the second extended position.

A10. The armrest assembly of paragraph A1, further comprising a retention device configured to releasably retain the secondary armrest in one or more positions, wherein the retention device includes a biased ball attached to one of the primary and secondary armrests that is movable along a vertical axis and one or more complementary recesses in the other of the primary and secondary armrests, such that the biased ball positively interacts with the recesses to releasably retain the secondary armrest in the one or more positions.

A11. The armrest assembly of paragraph A1, wherein the secondary armrest further includes a distal extension that is configured to be slidably extended along a longitudinal axis of the secondary armrest when it is not in the first stowed position.

A12. The armrest assembly of paragraph A1, further comprising a beveled or rounded edge along at least a portion of an edge of the secondary armrest surface.

A13. The armrest assembly of paragraph A1, where the primary armrest defines a slot or niche configured to receive the secondary armrest when the secondary armrest is in the first stowed position.

B1. A passenger vehicle chair structure, comprising a frame for the chair structure; a first and a second passenger seats, coupled to the frame and disposed adjacent one another; an armrest assembly disposed between the first and second passenger seats and pivotably coupled to the frame such that the armrest assembly is pivotable between a substantially horizontal deployed position and a substantially vertical retracted position; where the armrest assembly includes a primary armrest and a secondary armrest; the primary armrest including a primary armrest surface that, when the armrest assembly is in the deployed position, the primary armrest surface is accessible for use by a first passenger in one of the first and second passenger seats; and the secondary armrest including a secondary armrest surface and being coupled to the primary armrest such that the secondary armrest is movable between a first stowed position in which the secondary armrest is aligned with and at least substantially beneath the primary armrest and a second extended position in which at least a portion of the secondary armrest surface is exposed and accessible for use by a second passenger seated in the other of the first and second passenger seats.

B2. The chair structure of paragraph B1, where the secondary armrest is coupled to the primary armrest by a pivotable coupling at a proximal end of the primary armrest, and is pivotable between the first stowed position and the second extended position.

B3. The chair structure of paragraph B1, where the armrest assembly further comprises a retention device configured to releasably retain the secondary armrest in the first stowed position, the second extended position, or both.

B4. The chair structure of paragraph B3, wherein the retention device includes a spring-biased ball disposed in the secondary armrest that is movable along a vertical axis, and one or more recesses on an underside of the primary armrest, such that the spring-biased ball positively interacts with the one or more recesses to releasably retain the secondary armrest in a corresponding position.

B5. The chair structure of paragraph B1, further comprising a third passenger seat coupled to the frame, and a second armrest assembly disposed between the second and third passenger seats that is pivotably coupled to the frame such that the second armrest assembly is independently pivotable between a substantially horizontal deployed position and a substantially vertical retracted position; wherein the second armrest assembly also includes a primary armrest and a secondary armrest and is configured such that when the second armrest assembly is in the deployed position, the primary armrest surface of the second armrest assembly is accessible for use by a passenger; and the secondary armrest of the second armrest assembly includes a secondary armrest surface coupled to the primary armrest that is movable between a first stowed position in which the secondary armrest is aligned with and at least substantially beneath the primary armrest of the second armrest assembly and a second extended position in which at least a portion of the secondary armrest surface is exposed and accessible for use by another passenger.

B6. The chair structure of paragraph B5, where each secondary armrest further includes a distal extension that is configured to be slidably extended outwardly along a longitudinal axis of the secondary armrest when it is not in its first stowed position.

B7. The chair structure of paragraph B1, where the chair structure is configured for use in a passenger aircraft, a passenger train, a passenger ship, or a passenger bus.

Advantages, Features, Benefits

The different embodiments and examples of the armrest assemblies and passenger chair structures described herein provide several advantages over armrests previously employed for passenger vehicles.

Even when the primary armrest surface is being used, the armrest assemblies of the present disclosure can be extended to dispose a secondary armrest surface in a position and/or orientation that permits a second passenger to use the secondary armrest surface.

The extendable armrests are readily incorporated into new passenger vehicle construction. Additionally, the extendable armrest are compatible with existing passenger chair structures, and so can also be retrofitted into existing passenger vehicles. The additional armrest can be provided without substantially increasing the weight of the armrest assembly, and so overall weight and fuel economy of the passenger vehicle is essentially unaffected.

When the secondary armrest is not desired, it can easily be stowed away under the primary armrest, and where no armrest is needed, the entire armrest assembly can be pivoted into a retracted position.

The extendable armrest assemblies, and passenger chair structures employing them, represent a significant improvement in passenger comfort without requiring new engineering solutions, or dramatically increasing either manufacturing cost or vehicle weight.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An extendable armrest assembly, comprising:
   an elongate primary armrest having a proximal end, a distal end, an upper surface, and a lower surface, where the upper surface includes a primary armrest surface;
      wherein the primary armrest includes a coupling member disposed at the proximal end of the primary armrest, the coupling member being configured to pivotably couple the primary armrest to a frame of a passenger chair structure, so that when coupled the primary armrest is pivotable between a substantially horizontal deployed position and a substantially vertical retracted position; and
   an elongate secondary armrest, disposed beneath and aligned with the primary armrest, the secondary armrest having a proximal end, a distal end, and an upper surface that includes a secondary armrest surface;
      wherein the secondary armrest is coupled to the primary armrest so that the secondary armrest is movable from a first stowed position in which the secondary armrest is aligned with and at least substantially beneath the primary armrest and a second extended position in which a portion of the secondary armrest surface is exposed and accessible for use by a passenger; and
      wherein the secondary armrest further includes a distal extension that is configured to be slidably extended along a longitudinal axis of the secondary armrest when the secondary armrest is not in the first stowed position.

2. The armrest assembly of claim 1, wherein the primary armrest surface and the secondary armrest surface are substantially parallel.

3. The armrest assembly of claim 1, wherein the secondary armrest is coupled to the primary armrest by a pivotable coupling, and a pivot axis of the pivotable coupling is substantially perpendicular to both the primary armrest surface and the secondary armrest surface, so that pivoting the secondary armrest at the pivotable coupling exposes at least a portion of the secondary armrest surface for use by the passenger.

4. The armrest assembly of claim 1, wherein the secondary armrest is coupled to the primary armrest by a translational coupling, such that the secondary armrest can be translated to a side of the primary armrest to expose at least a portion of the secondary armrest surface for use by the seated passenger.

5. The armrest assembly of claim 1, wherein the secondary armrest is coupled to the primary armrest by a coupling that permits the secondary armrest to be moved to an extended position at either side of the primary armrest.

6. The armrest assembly of claim 1, further comprising a travel stop that is configured to limit an extent of movement of the secondary armrest relative to the primary armrest.

7. The armrest assembly of claim 1, wherein the secondary armrest is coupled to the primary armrest by a pivotable coupling, further comprising a travel stop that is configured to limit an extent of movement of the secondary armrest so that when the secondary armrest is in the second extended position the longitudinal axis of the secondary armrest is at an angle of 30° to 45° to a longitudinal axis of the primary armrest.

8. The armrest assembly of claim 1, further comprising a retention device configured to releasably retain the secondary armrest in the first stowed position.

9. The armrest assembly of claim 1, further comprising a retention device configured to releasably retain the secondary armrest in the second extended position.

10. The armrest assembly of claim 1, further comprising a retention device configured to releasably retain the secondary armrest in one or more positions, wherein the retention device includes a biased ball attached to one of the primary and secondary armrests that is movable along a vertical axis and one or more complementary recesses in the other of the primary and secondary armrests, such that the biased ball positively interacts with the recesses to releasably retain the secondary armrest in the one or more positions.

11. The armrest assembly of claim 1, further comprising a beveled or rounded edge along at least a portion of an edge of the secondary armrest surface.

12. A passenger vehicle chair structure, comprising;
a frame for the chair structure;
a first passenger seat, a second passenger seat, and a third passenger seat each coupled to the frame and disposed adjacent one another;
a first armrest assembly disposed between the first and second passenger seats and a second armrest assembly disposed between the second and third passenger seats, each armrest assembly being pivotably coupled to the frame such that the armrest assembly is pivotable between a substantially horizontal deployed position and a substantially vertical retracted position; wherein each armrest assembly includes a primary armrest and a secondary armrest;
the primary armrest of the first armrest assembly including a primary armrest surface that, when the first armrest assembly is in the deployed position, is accessible for use by a first passenger;
the secondary armrest of the first armrest assembly including a secondary armrest surface and being coupled to the primary armrest of the first armrest assembly to enable movement from a first stowed position in which the secondary armrest is aligned with and at least substantially beneath the primary armrest and a second extended position in which at least a portion of the secondary armrest surface is exposed and accessible for use by a second passenger;
the primary armrest of the second armrest assembly including a primary armrest surface that, when the second armrest assembly is in its deployed position, is accessible for use by a passenger seated in one of the second and third passenger seats;
the secondary armrest of the second armrest assembly including a secondary armrest surface and being coupled to the primary armrest of the second armrest assembly to enable movement from a first stowed position in which the secondary armrest is aligned with and at least substantially beneath the primary armrest and a second extended position in which at least a portion of the secondary armrest surface is exposed and accessible for use by a passenger seated in the other of the second and third passenger seats; and
each secondary armrest further including a distal extension that is configured to be slidably extended outwardly along a longitudinal axis of the secondary armrest when the secondary armrest is not in the first stowed position.

13. The chair structure of claim 12, wherein each secondary armrest is coupled to the corresponding primary armrest by a pivotable coupling at a proximal end of the corresponding primary armrest, and is pivotable between the first stowed position and the second extended position.

14. The chair structure of claim 12, wherein each armrest assembly further comprises a retention device configured to releasably retain the secondary armrest of the armrest assembly in the first stowed position, the second extended position, or both.

15. The chair structure of claim 14, wherein the retention device includes a spring-biased ball disposed in the secondary armrest of the armrest assembly that is movable along a vertical axis, and one or more recesses on an underside of the primary armrest of the armrest assembly, such that the spring-biased ball positively interacts with the one or more recesses to releasably retain the secondary armrest in a corresponding position.

16. The chair structure of claim 12, wherein the chair structure is configured for use in a passenger aircraft, a passenger train, a passenger ship, or a passenger bus.

17. A passenger vehicle chair structure, comprising:
a frame;
a first passenger seat and a second passenger seat each coupled to the frame and disposed adjacent one another;
an armrest assembly disposed between the first passenger seat and the second passenger seat and pivotably coupled to the frame such that the armrest assembly is pivotable between a substantially horizontal deployed position and a substantially vertical retracted position, the armrest assembly including an elongate primary armrest and an elongate secondary armrest; wherein
the primary armrest has an upper surface including a primary armrest surface that, when the armrest assembly is in the deployed position, is accessible for use by a passenger seated in either of the passenger seats;
the secondary armrest has an upper surface including a secondary armrest surface;
the secondary armrest is coupled to the primary armrest so that the secondary armrest is movable from a first stowed position in which the secondary armrest is aligned with and at least substantially beneath the primary armrest and a second extended position in which a portion of the secondary armrest surface is exposed and accessible for use by a passenger seated in one of the passenger seats; and
the secondary armrest in the first stowed position provides a bottom surface of the armrest assembly.

18. The chair structure of claim 17, wherein the secondary armrest is movable relative to the primary armrest in opposite directions to the second extended position and a third extended position, and wherein in the third extended position the secondary armrest surface is exposed and accessible for use by a passenger seated in the other of the passenger seats.

19. The chair structure of claim 17, further comprising a travel stop that is configured to limit an extent of movement of the secondary armrest relative to the primary armrest.

20. The chair structure of claim 17, further comprising a retention device configured to releasably retain the secondary armrest in the first stowed position.

* * * * *